US008325368B2

(12) United States Patent
Watanabe (10) Patent No.: US 8,325,368 B2
(45) Date of Patent: Dec. 4, 2012

(54) PRINT INFORMATION CONVERSION APPARATUS, PRINTING APPARATUS, PRINTING SYSTEM, AND COMPUTER READABLE MEDIUM (75) Inventor: Hirotake Watanabe, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 610 days.

(21) Appl. No.: 12/543,543

(22) Filed: Aug. 19, 2009

(65) Prior Publication Data
US 2010/0195142 A1  Aug. 5, 2010

(30) Foreign Application Priority Data
Jan. 30, 2009  (JP) ................................ 2009-020449

(51) Int. Cl.
G06F 3/12 (2006.01)
G06K 15/00 (2006.01)
(52) U.S. Cl. ....................... 358/1.15; 358/1.13; 358/1.14
(58) Field of Classification Search .................. None
See application file for complete search history.

(56) References Cited

U.S. PATENT DOCUMENTS
2002/0067502 A1  6/2002 Hansen
2003/0121007 A1*  6/2003 Coleman ...................... 715/522
2007/0097444 A1*  5/2007 Maeno .......................... 358/3.28
2007/0127085 A1*  6/2007 Mori ............................. 358/403
2007/0223025 A1  9/2007 Hashizume
2008/0062456 A1*  3/2008 Matsunoshita ............. 358/1.15
2008/0260287 A1* 10/2008 Berryman et al. ............ 382/284
2009/0002741 A1*  1/2009 Ozawa ......................... 358/1.13

FOREIGN PATENT DOCUMENTS
JP  2002-236569 A   8/2002
JP  2007-253598 A  10/2007

* cited by examiner

Primary Examiner — Benny Q Tieu
Assistant Examiner — Haris Sabah
(74) Attorney, Agent, or Firm — Sughrue Mion, PLLC (57) ABSTRACT A print information conversion apparatus is provided, the print information conversion apparatus including: a print information acquiring portion that acquires print information in a page description language format; a conversion portion that converts the acquired print information in the page description language format into electronic document information in an electronic document format; an addition portion that adds restoration information to the electronic document information, the restoration information being used for restoring nonreversible information that is contained in the print information in the page description language format and that is not reversibly convertible to the electronic document information; and a print information generating portion that generates print information based on the electronic document information and the restoration information added to the electronic document information.

9 Claims, 9 Drawing Sheets

PRINT INFORMATION CONVERSION APPARATUS, PRINTING APPARATUS, PRINTING SYSTEM, AND COMPUTER READABLE MEDIUM

CROSS-REFERENCE TO RELATED APPLICATIONS

This application is based on and claims priority under 35 U.S.C. 119 from Japanese Patent Application No. 2009-020449 filed Jan. 30, 2009.

BACKGROUND

1. Technical Field

The present invention relates to a print information conversion apparatus, a printing apparatus, a printing system, and a computer readable medium.

2. Related Art

Hitherto, information processors, such as a personal computer and a host computer, have transmitted to printing apparatuses connected thereto via network circuits print information described in a language called a page description language (hereunder referred to simply as a PDL) that can be interpreted by the printing apparatuses.

When the printing apparatuses receive the print information described in a PDL format and transmitted from the information processors, the printing apparatuses convert the received print information in a PDL format into print information in a bitmap format. Then, the printing apparatuses perform printing based on the print information in the bitmap format.

SUMMARY

According to an aspect of the present invention, there is provided a print information conversion apparatus, including:

a print information acquiring portion that acquires print information in a page description language format;

a conversion portion that converts the acquired print information in the page description language format into electronic document information in an electronic document format;

an addition portion that adds restoration information to the electronic document information, the restoration information being used for restoring nonreversible information that is contained in the print information in the page description language format and that is not reversibly convertible to the electronic document information; and a print information generating portion that generates print information based on the electronic document information and the restoration information added to the electronic document information.

BRIEF DESCRIPTION OF THE DRAWINGS

Exemplary embodiment of the present invention will be described in detail based on the following figures, wherein.

DETAILED DESCRIPTION

Hereinafter, a preferred mode for carrying out the invention (hereunder referred to simply as an exemplary embodiment) is described with reference to the accompanying drawings.

Figure 1:
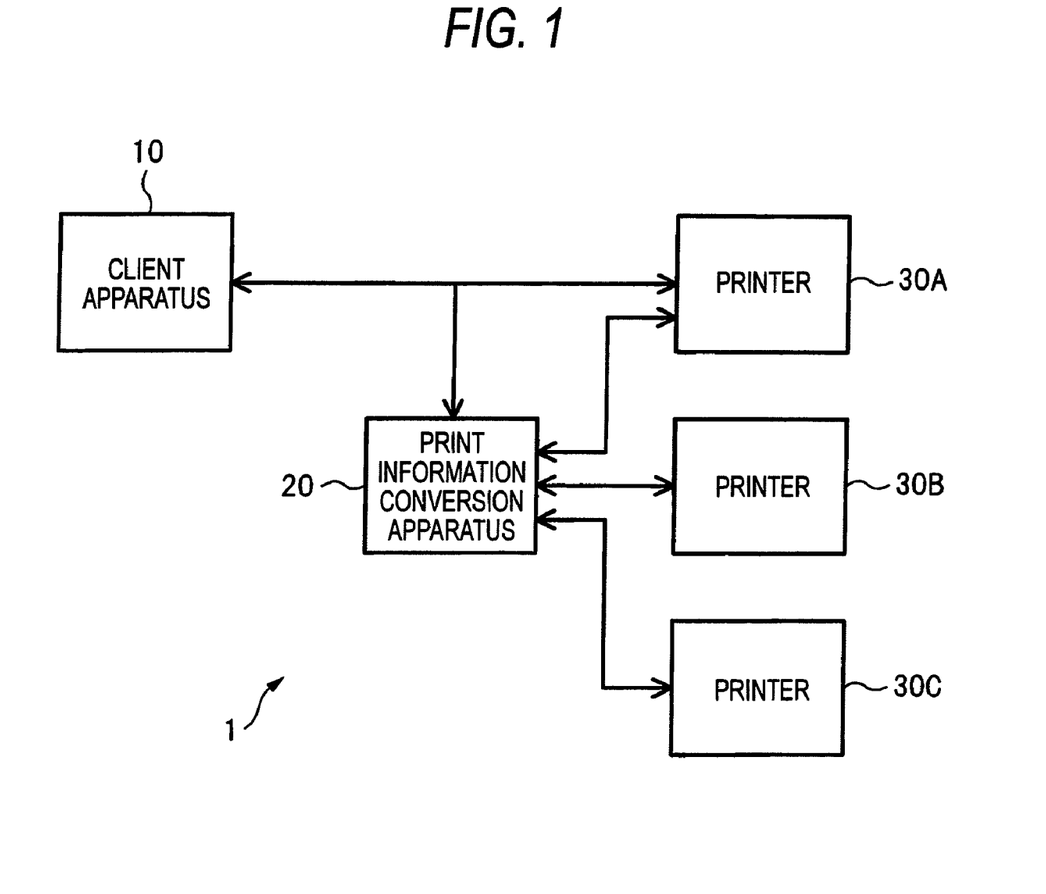
FIG. 1 is a diagram illustrating the system configuration of a printing system.

FIG. 1 is a diagram illustrating the system configuration of a printing system 1 according to the present exemplary embodiment. As illustrated in FIG. 1, the printing system 1 includes a client apparatus 10, a print information conversion apparatus 20, and printers 30A, 30B, and 30C. The client apparatus 10 performs data communication separately with the printer 30A and the printer information conversion apparatus 20. The print information conversion apparatus 20 performs data communication separately with the client apparatus 10 and the printers 30A, 30B, and 30C.

The client apparatus 10 generates print data in a PDL format and transmits the generated print data to both the printer 30A and the print information conversion apparatus 20. The client apparatus 10 may be configured to generate the print data in the PDL format, based on application data in application programs for editing documents and images. In the present exemplary embodiment, the PDL format of the print data generated by the client apparatus 10 is made a format of data that may be interpreted by a decomposer provided in the printer 30A. For example, a PostScript (registered trademark) format and a line-conditioned data stream (LCDS) format may be used as the PDL format.

The print information conversion apparatus 20 is a server that acquires print data in the PDL format transmitted from the client apparatus 10 and that converts the acquired print data into electronic document data in an electronic document format. A data format of data which may be interpreted and displayed by an application program that runs on a computer may be used as the electronic document format. For example, PDF may be used as the electronic document format. The print information conversion apparatus 20 generates restoration information for restoring information which is not reversibly convertible when the print data in the PDL format is converted into the electronic document data in the electronic document format, and information depending on print environment, either from the original print data in a PDL format or the resultant electronic document data in an electronic document format, or both. In addition, the print information conversion apparatus 20 adds the generated restoration information to the resultant electronic document data. Then, the print information conversion apparatus 20 manages the electronic document data into which the print data is converted, by storing the electronic document data in a storage means, such as a hard disk.

In response to a request from the client apparatus 10 or the like, the print information conversion apparatus 20 transmits the electronic document data itself, or generates and transmits display information which shows a data list of the electronic document data. When the print information conversion apparatus 20 receives from the client apparatus 10 or the like a print request specifying the electronic document data to manage and the printer to which print data is to be output, the print information conversion apparatus 20 generates print data according to the specified electronic document data, the restoration information added to this electronic document data, and the print data format and print environment of the specified printer. The print information conversion apparatus 20 outputs the generated print data to the specified printer. Thus, the print information conversion apparatus 20 converts the print data in a PDL format into electronic document data that can be displayed by a general-purpose computer. In addition, the print information conversion apparatus 20 has the function of reconverting the print data into the format corresponding to the printer, based on the converted electronic document data, and of outputting this print data. The detailed configuration of the print information conversion apparatus 20 for implementing the above processing is described below.

The printer 30A is a printing apparatus which causes a decomposer provided therein to analyze print data in the PDL format transmitted from the client apparatus 10 and generate a print image, and which prints the generated print image by transferring the generated print image onto printing paper. According to the present exemplary embodiment, the printer 30A is used as the core document printing apparatus having capability to perform a large amount of document printing at high speed. When such a large amount of document printing is performed at high speed, preprinted forms are used, on which document templates and backgrounds are preliminarily printed. In addition, print data in the PDL format designated to be output to the printer 30A is limited to contents of documents.

The printer 30B is a printing apparatus that receives print data generated by the print information conversion apparatus 20 and that performs print processing of the print data. According to the present exemplary embodiment, the printer 30B is set as a printing apparatus that performs print processing after analyzing print data in a PDL format which may either be the same as or differ from the PDL format employed by the printer 30A. However, the print environment of the printer 30B is made different from that of the printer 30A. According to the present exemplary embodiment, in the print environment of the printer 30B, there are no preprinted forms, whereas these are used by the printer 30A.

The printer 30C is a printing apparatus that receives print data generated by the print information conversion apparatus 20 and that performs print processing on the print data. According to the present exemplary embodiment, the printer 30C is assumed to perform print processing after directly analyzing electronic document data (PDF data).

Figure 2:
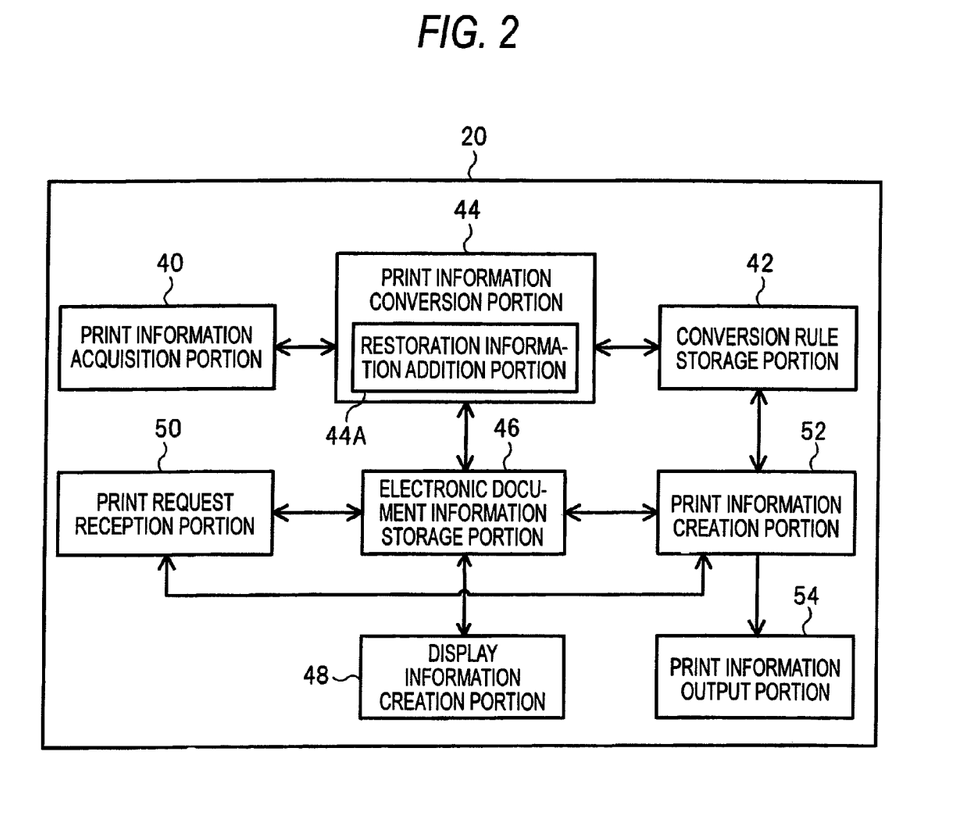
FIG. 2 is a functional block diagram illustrating a print information conversion apparatus.

FIG. 2 is a functional block diagram illustrating the print information conversion apparatus 20. As illustrated in FIG. 2, the print information conversion apparatus 20 includes a print information acquisition portion 40, a conversion rule storage portion 42, a print information conversion portion 44, an electronic document information storage portion 46, a display information generating portion 48, a print request reception portion 50, a print information generating portion 52, and a print information output portion 54.

The print information conversion apparatus 20 includes hardware constituting a computer, e.g., a control means comprising a central processing unit (CPU), a storage means comprising a semiconductor memory device and a magnetic disk apparatus, and a communication means comprising a network interface and the like. The print information conversion apparatus 20 implements the functions of the above portions. Incidentally, the functions of each of the above portions can be implemented by a program that is stored in a computer-readable information storage medium and that is read and executed by the print information conversion apparatus 20 which is a computer system using a medium reading apparatus (not shown). The program can be supplied to the print information conversion apparatus 20 using an information storage medium. Alternatively, the program can be supplied thereto via a data communication network such as the Internet.

The print information acquisition portion 40 receives and acquires print data in the PDL format transmitted from the client apparatus 10.

The conversion rule storage portion 42 stores information describing conversion rules for the conversion among PDL formats and electronic document formats. The conversion rules are determined beforehand. In the present exemplary embodiment, the conversion rule storage portion 42 stores at least conversion rules for conversion between the print data formats of electronic documents and the printers 30A, 30B and 30C.

The print information conversion portion 44 converts print data in a PDL format acquired by the print information acquisition portion 40 into electronic document data in an electronic document format. The print information conversion portion 44 includes a restoration information addition portion 44A, the details of which are described below. Hereinafter, the details of a print data conversion process performed in the print information conversion portion 44 are described.

The print information conversion portion 44 refers to information determining the rules for conversion between the PDL format of original data and the electronic document format of resultant data from among the conversion rules stored in the conversion rule storage portion 42. The print information conversion portion 44 analyzes print data in the PDL format acquired by the print information acquisition portion 40. In addition, the print information conversion portion 44 converts information on the print data in the PDL format into information on electronic document data in the electronic document format according to the above rules that are referred to by the print information conversion portion 44. When the print information conversion portion 44 converts the print data in the PDL format into the electronic document data in the electronic document format, information (hereunder referred to as "irreversibly converted information") which is not reversibly convertible between the original print data in the PDL format and the resultant electronic document data in the electronic document format and information (hereunder referred to as "dependent information") depending on the environment of the printing apparatus (e.g., the printer 30A) are not described in the resultant electronic document data in the electronic document format. Thus, the above data is converted into data which can be described with the electronic document format. In this case, the contents of the original print data in the PDL format are lost. Accordingly, restoration information for restoring the irreversibly converted information and the dependent information from the resultant electronic document data is generated by the restoration information addition portion 44A which is described below. Then, the generated restoration information is added by the restoration information addition portion 44A to the electronic document data.

The restoration information addition portion 44A generates restoration information for restoring the irreversibly converted information which is not reversibly converted between the print data in the PDL format and the electronic document data in the electronic document format, or the dependent information depending on the print environment among various types of information, or both, which are included in the original print data in the PDL format, from the converted electronic document data.

Hereinafter, concrete examples of the irreversibly converted information and the dependent information are described. First, the irreversibly converted information includes print operation setting information specific to the original print data in the PDL format, e.g., two-sided printing, printing layout, blank sheet inclusion, and the optimization of the number of print copies. The irreversibly converted information includes command information that is included in the original print data in the PDL format for which there is no corresponding command information in the resultant electronic document data in the electronic document format. The dependent information includes information which corresponds to "printing paper specification information", "barcode specification information", "logo image specification information" and the like which is specified according to the print environment, and which is not retained.

When the irreversibly converted information and the dependent information are deleted by a conversion, the restoration information is generated in a form separate from the contents of the displayed data, such as comments, and is attached to the electronic document information. At that time, the restoration information may include information on the content of the conversion, such as deletions. In addition, the restoration information can be added to the electronic document information in a manner in which it can be clearly known which of the electronic document information obtained by the conversion corresponds to the restoration information. For example, comments containing the restoration information can be inserted before or after information obtained by the conversion of the irreversibly converted information and the dependent information.

Figure 3A:
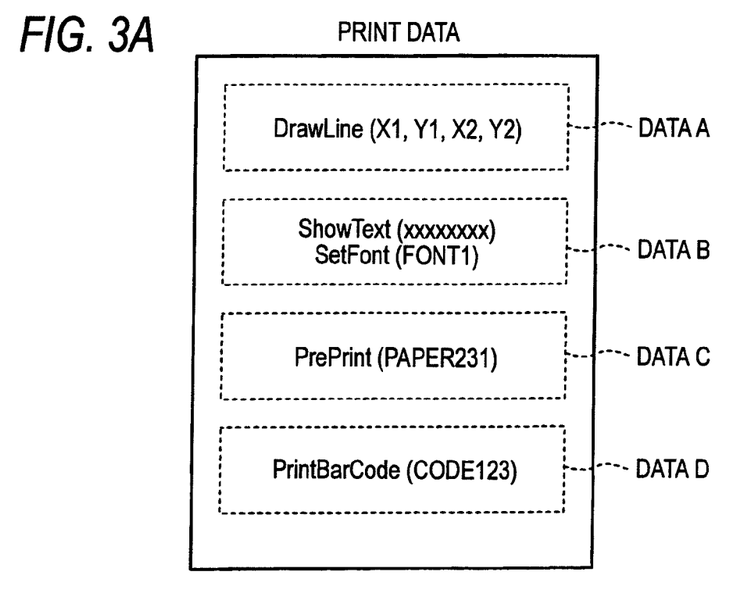
FIG. 3A is a diagram illustrating an example of the data configuration of print data in a PDL format.
Figure 3B:
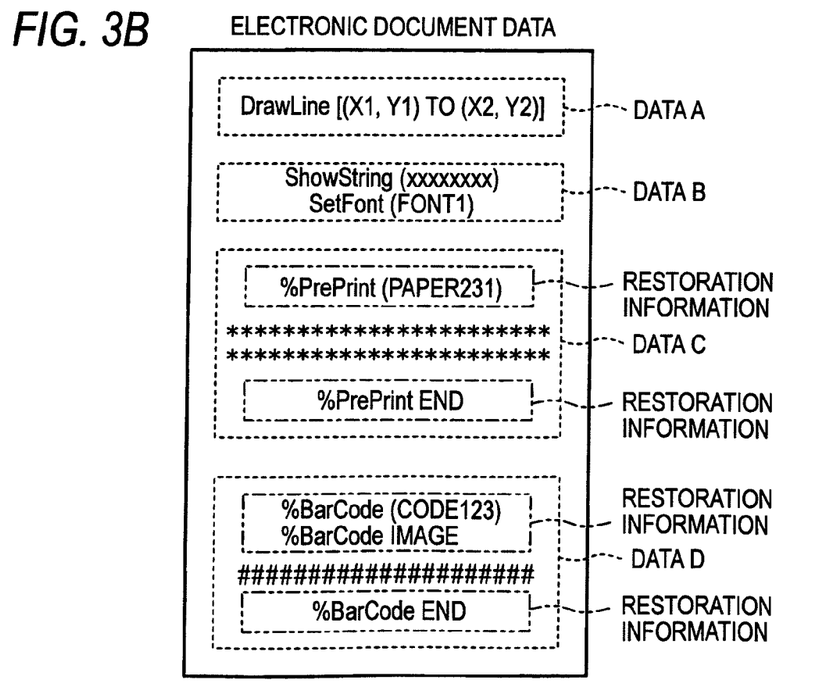
FIG. 3B is a diagram illustrating an example of the data configuration of electronic document data.

Hereinafter, a concrete example of a process performed in the print information conversion portion 44 is described by referring to FIGS. 3A and 3B. FIG. 3A illustrates an example of the data configuration of the print data in the PDL format. FIG. 3B illustrates an example of the electronic document data obtained by the conversion based on the print data.

As illustrated in FIG. 3A, data A of the print data describes an instruction to output a line drawing. Data B describes an instruction to output a text, also specifying the font. Data C describes information specifying a preprinted form to be used. Data D describes information specifying a barcode image.

As illustrated in FIG. 3B, in electronic document data generated by converting the print data shown in FIG. 3A, data A of the electronic document data describes a command in the electronic document format obtained by converting an command corresponding to the data A of the print data according to the conversion rules. Data B of the electronic document data describes an instruction in the electronic document format obtained by converting an instruction corresponding to the data B similarly. Data C of the electronic document data describes image data (bitmap data) representing a preprinted form specified by the data C of the print data, together with identification information identifying the preprinted form added as the restoration information. Data D of the electronic document data describes image data representing a barcode specified by the data D of the print data, together with identification information identifying the barcode added as the restoration information.

The electronic document information storage portion 46 stores electronic document data obtained by the conversion performed by the print information conversion portion 44.

The display information generating portion 48 generates display data representing the contents of the electronic document, based on the electronic document data stored in the electronic document information storage portion 46. For example, the display information generating portion 48 may generate display data representing the contents of a specified electronic document among the electronic documents stored in the electronic document information storage portion 46. Alternatively, display data comprising a list of thumbnail images of a plurality of electronic documents can be generated. Display data generated by the display information generating portion 48 can be displayed on the screen of a display unit connected to the print information conversion apparatus 20. Alternatively, such display data can be transmitted to a client apparatus 10 and displayed on the screen of the display unit connected to the client apparatus 10.

The print request reception portion 50 receives a print request for an electronic document stored in the electronic document information storage portion 46 together with information specifying the printer to which print data is output. For example, when a list of electronic document data is generated by the display data generation portion 48 as display data, the print request reception portion 50 can be configured to receive a print request for printing an electronic document selected from the list of the electronic documents displayed by the display data. Print requests can be received, based on an input operation performed by a user using an input device, such as a keyboard or a mouse which is connected to the print information conversion apparatus 20. Alternatively, print requests can be received from the client apparatus 10.

In response to a print request received by the print request reception portion 50, the print information generating portion 52 generates print data based on electronic document data specified by the print request and the specified printer to which the print data is output. At that time, the print information generating portion 52 generates print data in a format corresponding to the printer to which the print data is output, based on the electronic document data and the restoration data added thereto, and the print environment of the output printer.

More specifically, the print information generating portion 52 specifies the format of print data corresponding to the printer to which the print data is output. Then, the print information generating portion 52 refers to the conversion rules for the conversion between the electronic document format and the format of the specified print data which are included in the conversion rules stored in the conversion rule storage portion 42. If information representing the print environment of the printer to which the print data is output is obtained, the print information generating portion 52 refers to print environment information and selects, from the restoration information attached to the electronic document data, information to be restored in the form of a control instruction or the like into the print data to be generated. Then, the print information generating portion 52 generates print data, based on the electronic document data, the result of the above selection, and the conversion rules which are referred to.

Figure 4A:
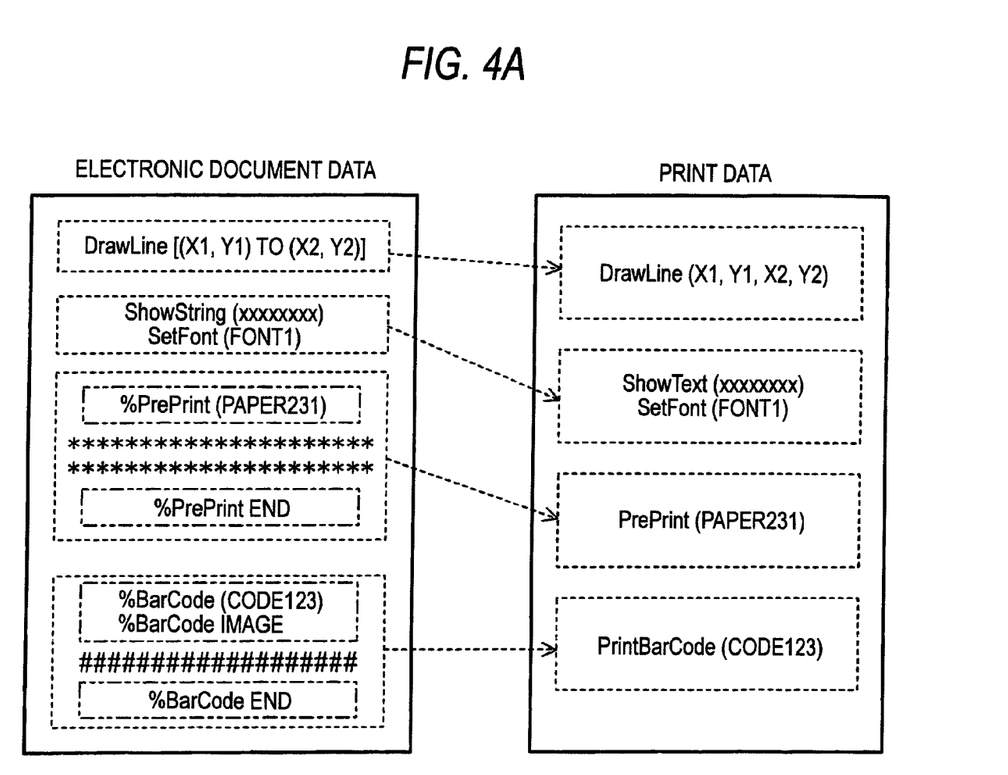
FIG. 4A is a diagram illustrating an example of electronic document data and print data generated based on the electronic document data.

Hereinafter, an example of a process performed in the print information generating portion 52 is described more concretely with reference to FIGS. 4A to 4C. FIG. 4A illustrates an example of electronic document data and print data in the PDL format of the printer 30A which is generated based on the electronic document data. As illustrated in FIG. 4A, in the print environment of the printer 30A, both the information specifying "a preprinted form" and the information specifying "a barcode" can be recognized. Accordingly, the print information generating portion 52 deletes image data representing images respectively corresponding to both the "preprinted form" and the "barcode" and replaces this image data with identification information identifying the "preprinted form" and identification information identifying the "barcode", respectively, and generates print data. Thus, the print information generating portion 52 generates print data identical to the PDL format print data before conversion, based on the electronic document data.

Figure 4B:
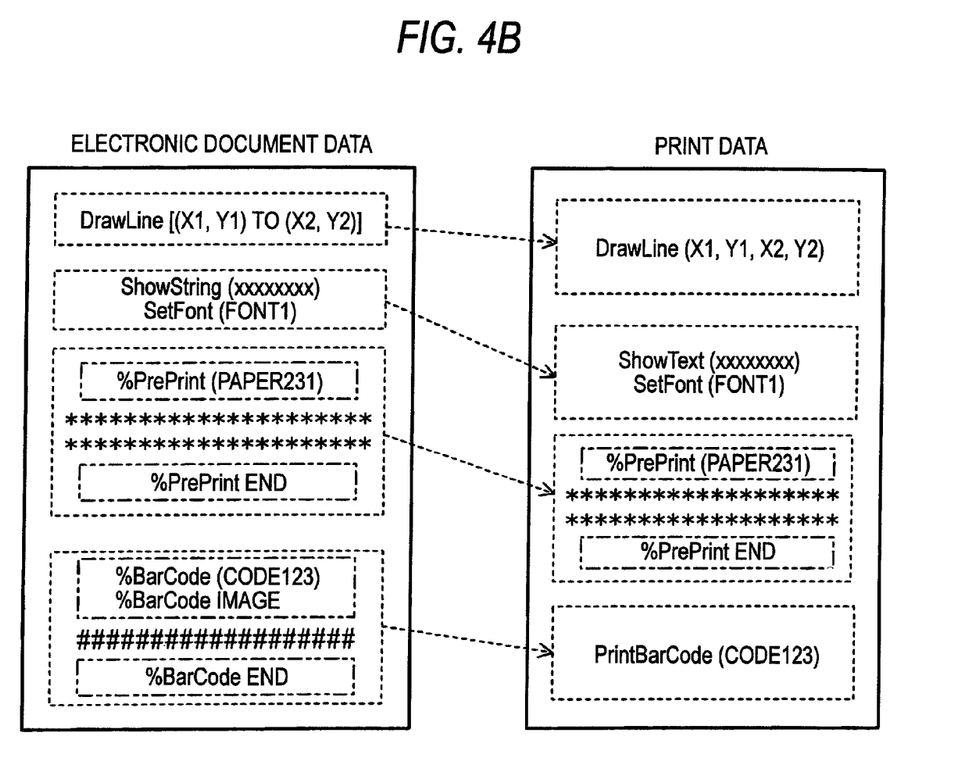
FIG. 4B is a diagram illustrating an example of electronic document data and print data generated based on the electronic document data.

FIG. 4B illustrates examples of electronic document data and print data in the PDL format of the printer 30B which is generated based on the electronic document data. The print environment of the printer 30B has no preprinted form. However, a barcode is recognized. In this case, the print information generating portion 52 retains the image data representing a preprinted form, but deletes image data representing a "barcode" and generates print data, replacing it with identification information identifying the "barcode". Thus, the print information generating portion 52 generates print data corresponding to the environment of the printer 30B, based on the electronic document data.

Figure 4C:
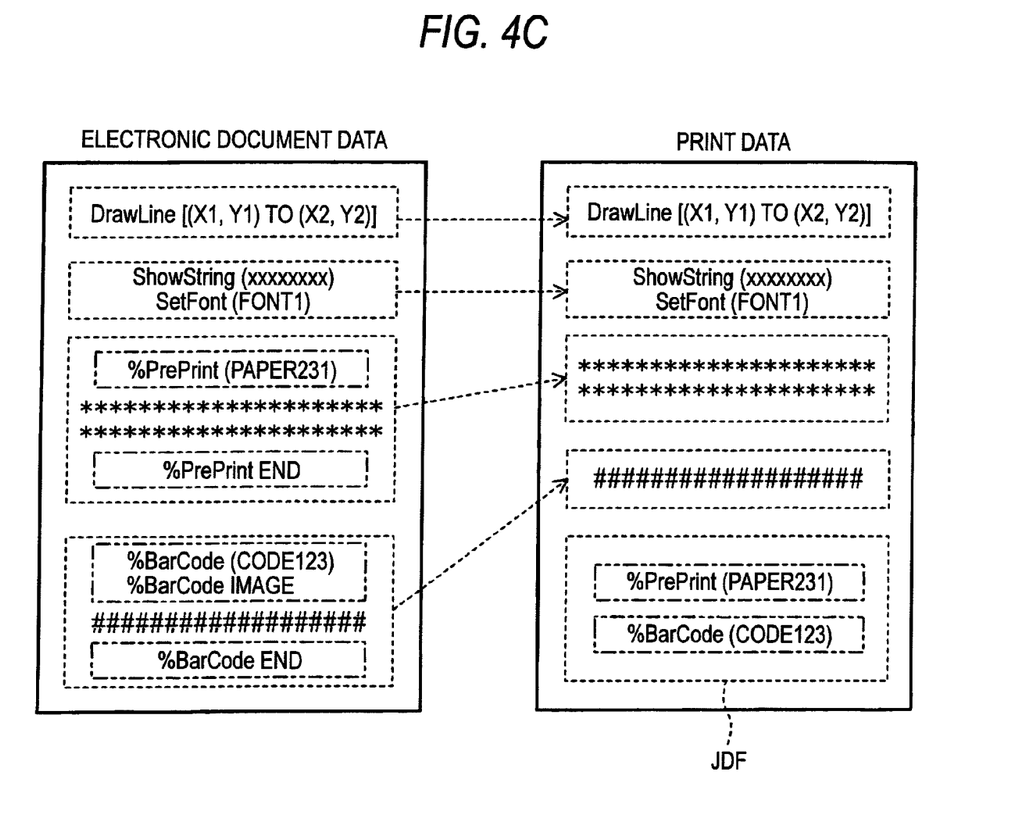
FIG. 4C is a diagram illustrating an example of electronic document data and print data generated based on the electronic document data.

FIG. 4C shows examples of electronic document data and of print data which corresponds to the printer 30C and which is generated based on the electronic document data. The printer 30C is configured to include a decomposer that directly analyzes electronic document data and prints out the electronic document data. In this case, the print information generating portion 52 generates printer control information based on restoration information attached to the electronic document data. In addition, the print information generating portion 52 generates print data by attaching the generated printer control information JDF to the electronic document data.

The print information output portion 54 outputs print data generated by the print information generating portion 52 to the specified printer. Output of the print data can be performed via a data communication circuit.

Next, a print information conversion process performed in the printing system 1 and the flow of each process in the print information generating are described with reference to sequence charts in FIGS. 5 and 6.

Figure 5:
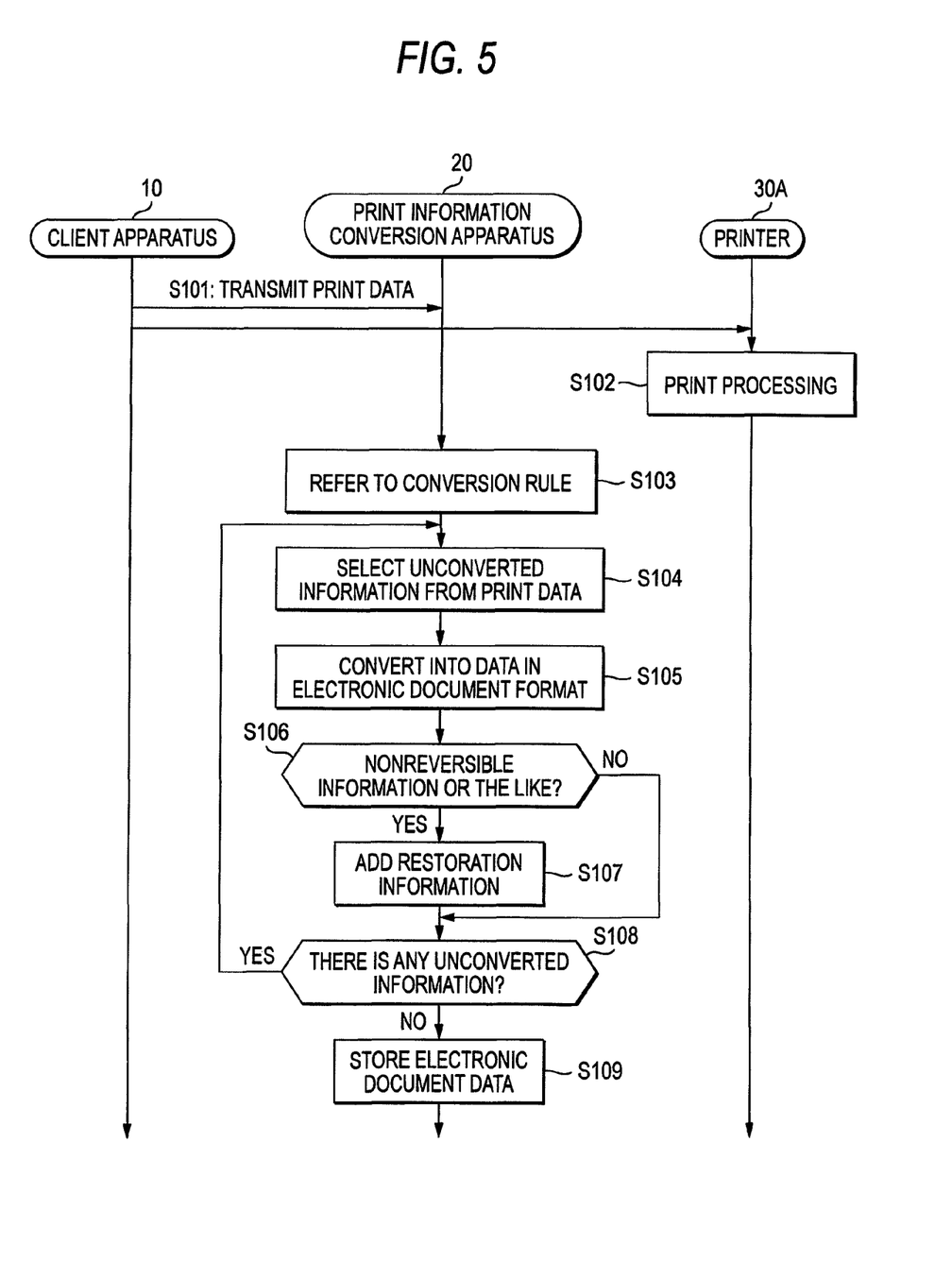
FIG. 5 is a sequence chart illustrating a print information conversion process.

FIG. 5 is a sequence chart illustrating a print information conversion process performed in the printing system 1, i.e., the process of converting print data transmitted from the client apparatus 10 into electronic document data. As illustrated in FIG. 5, in step S101, the client apparatus 10 transmits print data in the PDL format corresponding to the printer 30A to the printer 30A and the print information conversion apparatus 20. In step S102, the printer 30A performs print processing based on print data transmitted thereto.

In step S103, the print information conversion apparatus 20 refers to conversion rules for converting the transmitted print data in the PDL format into electronic document data in an electronic document format. Then, in step S104, the print information conversion apparatus 20 selects unconverted information included in the print data. In step S105, the print information conversion apparatus 20 converts the selected information into electronic document in the electronic document format based on the conversion rules referred to. At that time, in step S106, the print information conversion apparatus 20 determines whether the selected information is irreversibly converted information which cannot be reversibly converted between original print data in the PDL format and resultant electronic document data in the electronic document format, or is dependent information that depends on the print environment. If the print information conversion apparatus 20 determines that the selected information is the irreversibly converted information or the dependent information (Y in step S106), in step S107, the print information conversion apparatus 20 generates restoration information for restoring the irreversibly converted information or the dependent information from the electronic document data in the electronic document format, and attaches the restoration information to the electronic document data. On the other hand, if the print information conversion apparatus 20 determines that the selected information is neither the irreversibly converted information nor the dependent information (N in step S106), and if the restoration information is added thereto, in step S108, the print information conversion apparatus 20 determines whether there is any unconverted information in the print data. If the print information conversion apparatus 20 determines that there is unconverted information in the print data (Y in step S108), the process returns to step S104. Then, processing in step S104 and the subsequent steps is repeated. If the print information conversion apparatus 20 determines that there is no unconverted information in the print data (N in step S108), in step S109, the electronic document data obtained by the conversion is stored. Then, the process is finished.

Figure 6:
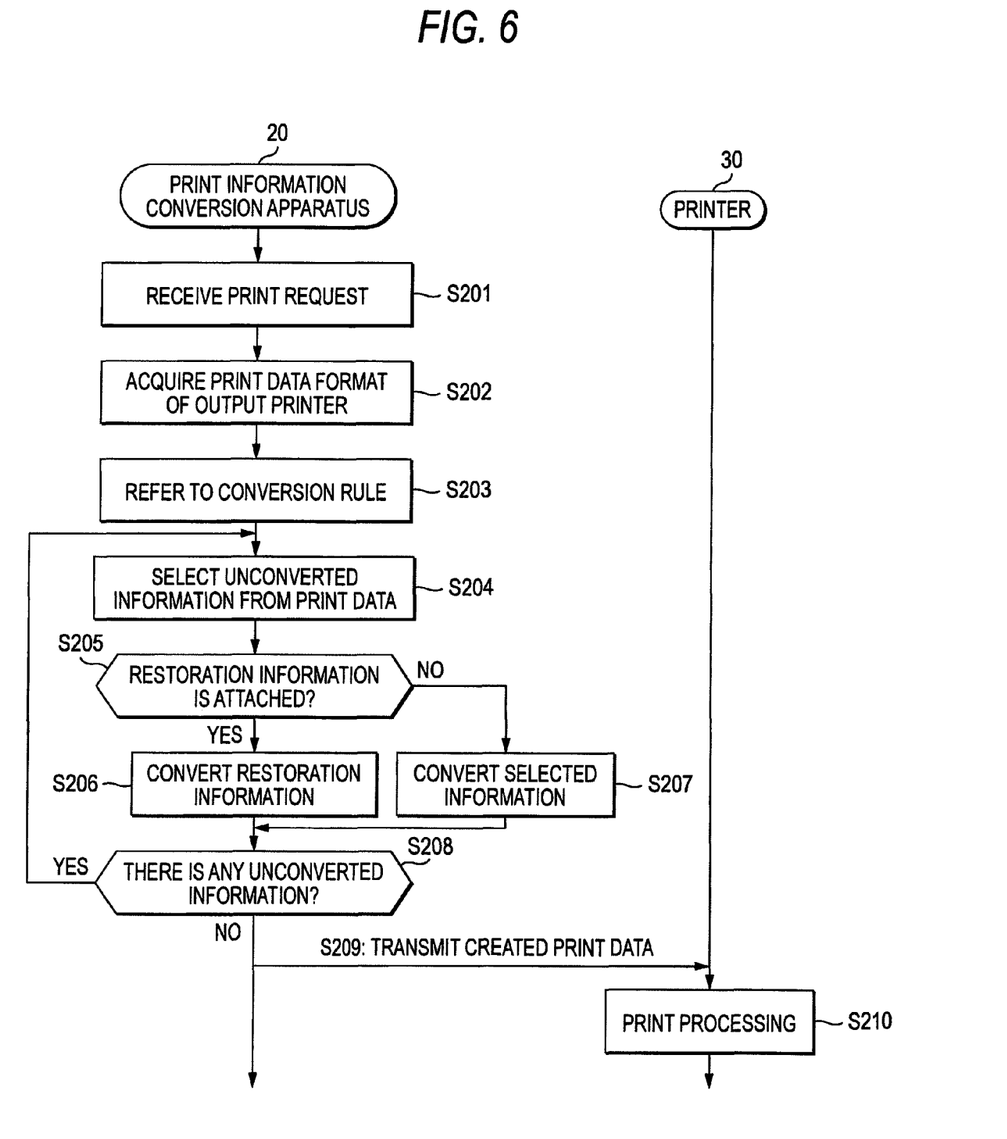
FIG. 6 is a sequence chart illustrating a print information generating process.

FIG. 6 is a sequence chart illustrating a print information generating process of generating print data based on the electronic document data the printing of which is requested. As illustrated in FIG. 6, in step S201, the print information conversion apparatus 20 receives a print request specifying an electronic document and the printer to which print data is output. Then, in step S202, the print information conversion apparatus 20 acquires the print data format corresponding to the printer to which print data is output.

In step S203, the print information conversion apparatus 20 refers to the conversion rules corresponding to the electronic document format of the electronic document data to be converted and the print data format into which the data is to be converted. In step S204, the print information conversion apparatus 20 selects the unconverted information included in the electronic document data. In step S205, the print information conversion apparatus 20 determines whether restoration information that can be interpreted by the printer to which print data is output is attached to the selected information. If the print information conversion apparatus 20 determines that such restoration information is attached to the selected information (Y in step S205), in step S206, the print information conversion apparatus 20 converts the restoration information into information in the format of the print data. On the other hand, if the print information conversion apparatus 20 determines that such restoration information is not added to the selected information (N in step S205), in step S207, the print information conversion apparatus 20 converts the selected information into information in the print data format, based on the conversion rules referred to.

Next, in step S208, the print information conversion apparatus 20 determines whether there is unconverted information in the electronic document data. If the print information conversion apparatus 20 determines that there is unconverted information in the electronic document data (Y in step S208), the process returns to step S204. Then, processing to be performed in step S204 and the subsequent steps are repeated. If the print information conversion apparatus 20 determines that there is no unconverted information in the electronic document data (N in step S208), in step S209, the print information conversion apparatus 20 transmits the converted print data to the specified printer. In step S210, the printer receives the print data transmitted from the print information conversion apparatus 20 and performs print processing based on the print data.

In the printing system described above, the print data in the PDL format is converted into the electronic document data in the electronic document format, which is used for displaying the data by a computer. Then, when printing is performed based on the electronic document data obtained by the conversion, print data in which information included in the original print data in the PDL format is restored is generated. Thus, a printed document based on the electronic document data can be prevented from differing from the printed document based on the original print data in the PDL format.

Figure 7:
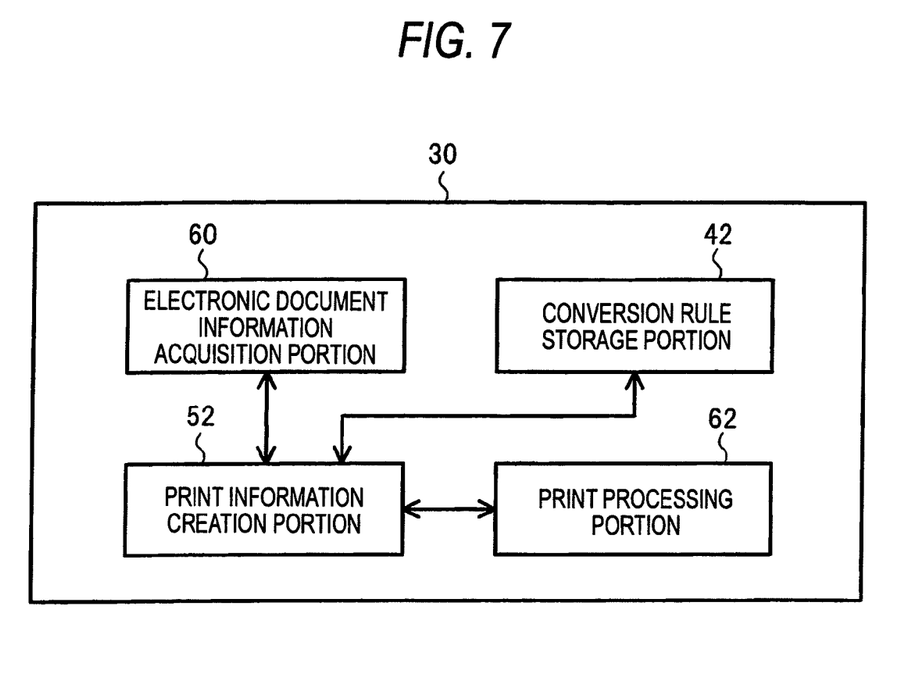
FIG. 7 is a functional block diagram of a printer.

The invention is not limited to the above exemplary embodiments. For example, although the print information conversion apparatus 20 generates print data in the format corresponding to the printer to which the print data is output and outputs the generated print data to the printer in the above exemplary embodiments, the system can be configured so that the printer acquires the electronic document data stored in the print information conversion apparatus 20 and performs the print information generating process and the printing. FIG. 7 is a function block diagram of a printer 30 having the function of generating print information.

As illustrated in FIG. 7, the printer 30 includes an electronic document information acquisition portion 60, a conversion rule storage portion 42, a print information generating portion 52, and a printing portion 62. Portions designated with a reference numeral found in the above exemplary embodiments have the same function as that portion in the above exemplary embodiments. Thus, detailed description of each of such portions is omitted.

The electronic document information acquisition portion 60 receives and acquires electronic document information transmitted from the print information conversion portion 44. The print information generating portion 52 generates print data based on electronic document data acquired by the electronic document information acquisition portion 60, restoration information attached to this electronic document data, the print data format employed by the printer, the print environment of the printer, and conversion rules stored in the conversion rule storage portion 42 which are for converting an electronic document format into the print data format of the printer. Then, the print processing portion 62 performs printing based on the print data generated by the print information generating portion 52.

In the foregoing description of the above exemplary embodiments, examples of using the print information conversion apparatus 20 with a server computer have been described. However, it is clear that the print information conversion apparatus 20 can also be configured so as to be used with a printing apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A print information conversion apparatus, comprising:
a print information acquiring portion that acquires print information in a page description language format;
a conversion portion that converts the acquired print information in the page description language format into electronic document information in an electronic document format;
an addition portion that adds restoration information to the electronic document information, the restoration information being used for restoring nonreversible information that is contained in the print information in the page description language format and that is not reversibly convertible to the electronic document information; and
a print information generating portion that generates print information based on the electronic document information and the restoration information added to the electronic document information,
wherein at least one of the print information acquiring portion, the conversion portion, the addition portion, and the print information generating portion includes a hardware circuit.

2. The print information conversion apparatus according to claim 1, further comprising:
a reception portion that receives a request for printing out the electronic document information converted by the conversion portion from a specified printing apparatus; and
a print information output portion,
wherein, in response to the request received by the reception portion, the print information generating portion generates print information in a format corresponding to the specified printing apparatus based on the electronic document information to be printed out and the restoration information added to the electronic document information and a print control corresponding to the specified printing apparatus; and
the print information output portion outputs the print information in the format corresponding to the specified printing apparatus into the specified printing apparatus.

3. The print information conversion apparatus according to claim 2,
wherein the print information generating portion generates print control information corresponding to the specified printing apparatus, based on the restoration information added to the electronic document information; and
the print information generating portion adds the created print control information to the electronic document information so as to generate print information.

4. The print information conversion apparatus according to claim 1,
wherein the restoration information includes conversion information containing a converted content of the non-reversible information converted into information in the electronic document format.

5. The print information conversion apparatus according to claim 2, further comprising:
a display information generating portion that generates display information to be displayed based on the electronic document information converted by the conversion portion,
wherein the print information in the page description language format contains designation information, the designation information containing any of designations including a designation of a preprinted form and a designation of a barcode;

the conversion portion converts the designation information into image information corresponding to the designation information; and the display information generating portion generates display information for the image information converted by the conversion portion.

6. The print information conversion apparatus according to claim 5, wherein the print information generating portion deletes the display information for the image information generated by the display information generating portion, and generates the print information in the format corresponding to the specified printing apparatus.

7. A printing apparatus, comprising:

an electronic document information acquiring portion that acquires the electronic document information converted by the print information conversion apparatus according to claim 1; and a printing portion that performs printing based on the electronic document information acquired by the electronic document information acquiring portion and the restoration information added to the electronic document information.

8. A printing system, comprising:

a first printing apparatus;

a second printing apparatus; and a print information conversion apparatus, wherein the first printing apparatus includes a printing portion that performs printing based on print information in a page description language format;

the print information conversion apparatus includes:

a print information acquiring portion that acquires the print information in the page description language format;

a conversion portion that converts the acquired print information in the page description language format into electronic document information in an electronic document format;

an addition portion that adds restoration information to the electronic document information, the restoration information being used for restoring nonreversible information that is contained in the print information in the page description language format and that is not reversibly convertible to the electronic document information;

a reception portion that receives a request for print out the electronic document information converted by the conversion portion from the second printing apparatus;

a print information generating portion that, in response to the request received by the reception portion, generates print information in a format corresponding to the second printing apparatus based on the electronic document information to be printed and the restoration information added to the electronic document information; and a print information output portion that outputs the print information generated by the print information generating portion to the second printing apparatus; and the second printing apparatus includes a printing portion that prints the print information output by the print information output portion.

9. A non-transitory computer readable medium storing a program causing a computer to execute a process for converting print information, the process comprising:

acquiring print information in a page description language format;

converting the acquired print information in the page description language format into electronic document information in an electronic document format;

adding restoration information to the electronic document information, the restoration information being used for restoring nonreversible information that is contained in the print information in the page description language format and that is not reversibly convertible to the electronic document information; and generating print information based on the electronic document information and the restoration information added to the electronic document information.

* * * * *